United States Patent [19]
O'Hare et al.

[11] 3,931,857
[45] Jan. 13, 1976

[54] DEMOUNTABLE MULTI-ROW POTATO COMBINE

[75] Inventors: Edward C. O'Hare, Cambridge; Wallace J. DeVries, Sr., Braham, both of Minn.

[73] Assignee: Dahlman, Inc., Braham, Minn.

[22] Filed: Dec. 9, 1974

[21] Appl. No.: 530,953

[52] U.S. Cl. .................................................. 171/14
[51] Int. Cl.² .......................................... A01D 17/00
[58] Field of Search .................... 171/28, 26, 14, 25

[56] References Cited
UNITED STATES PATENTS

| | | | |
|---|---|---|---|
| 965,667 | 7/1910 | Thompson | 171/28 |
| 2,633,685 | 4/1953 | Edwards | 171/28 |
| 3,106,249 | 10/1963 | Zachery | 171/14 |

*Primary Examiner*—Russell R. Kinsey
*Attorney, Agent, or Firm*—Leo Gregory

[57] ABSTRACT

A conventional two row potato combine basic frame and conveyor structure having removably mounted thereon a four row potato digger apron supported by a removable outboard and inboard frame and support members and having removably mounted onto said frame structure a pair of spaced angularly disposed conveyors converging crop from said multi-row digger apron onto a single elevating conveyor of said basic frame structure.

8 Claims, 6 Drawing Figures

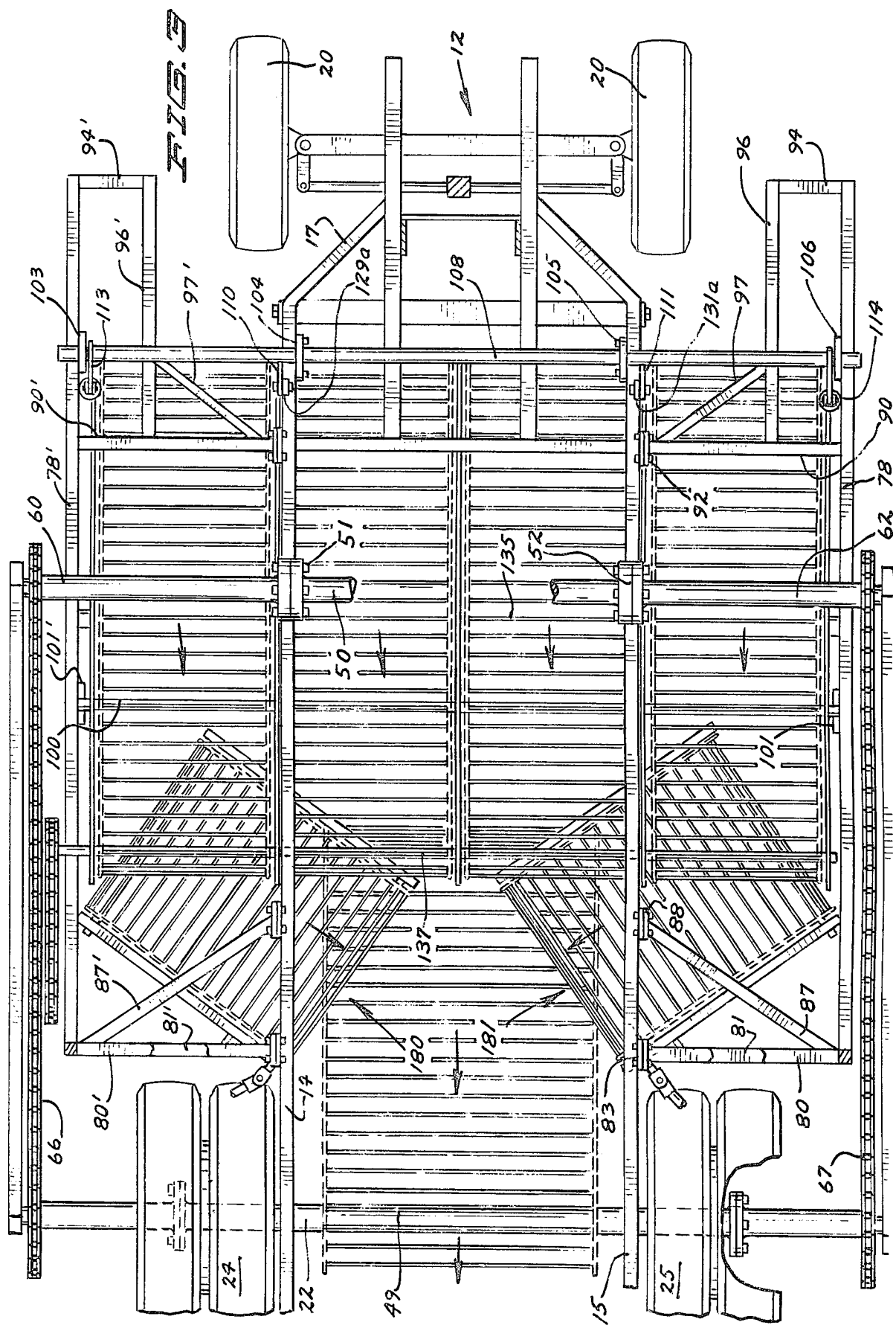

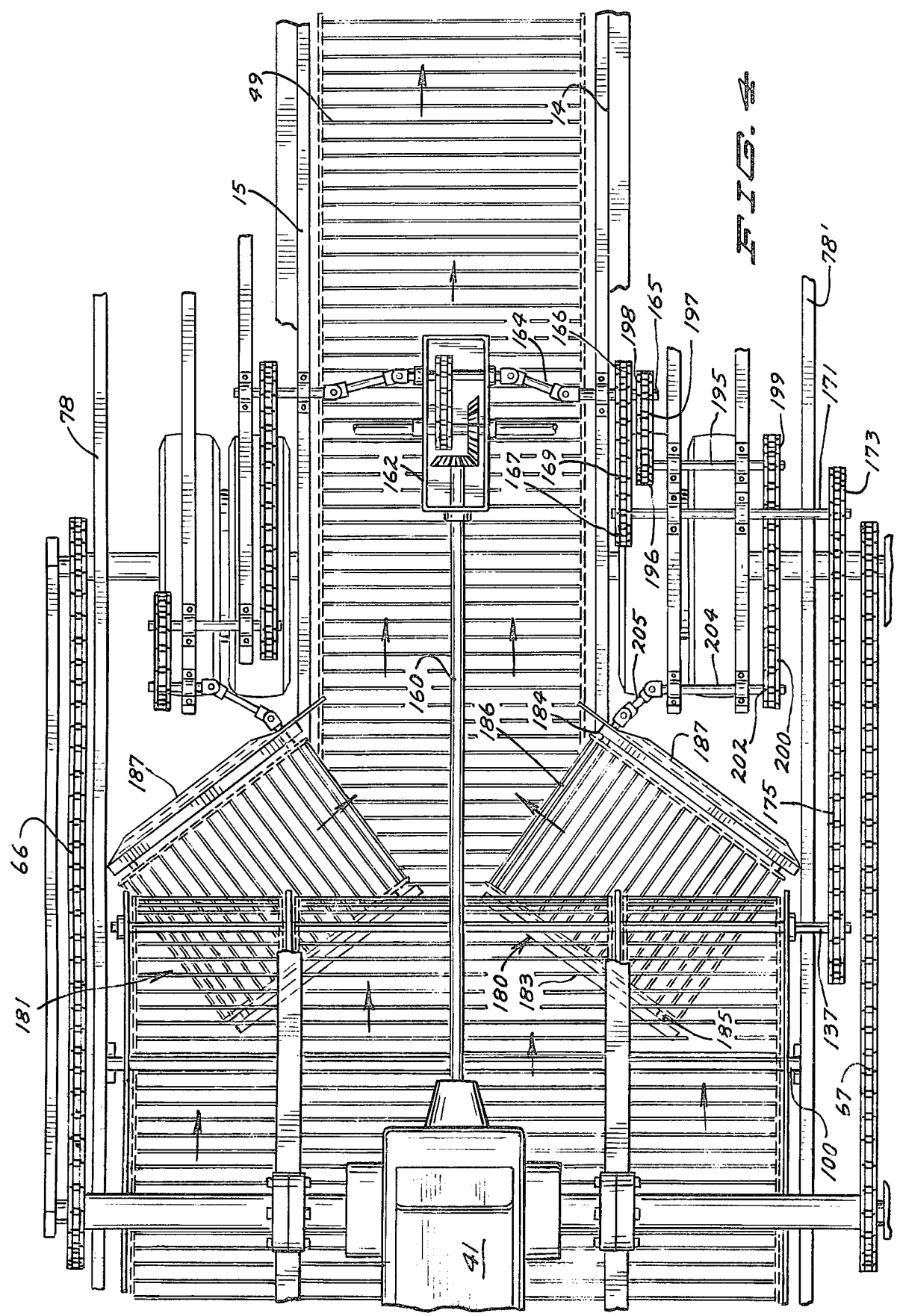

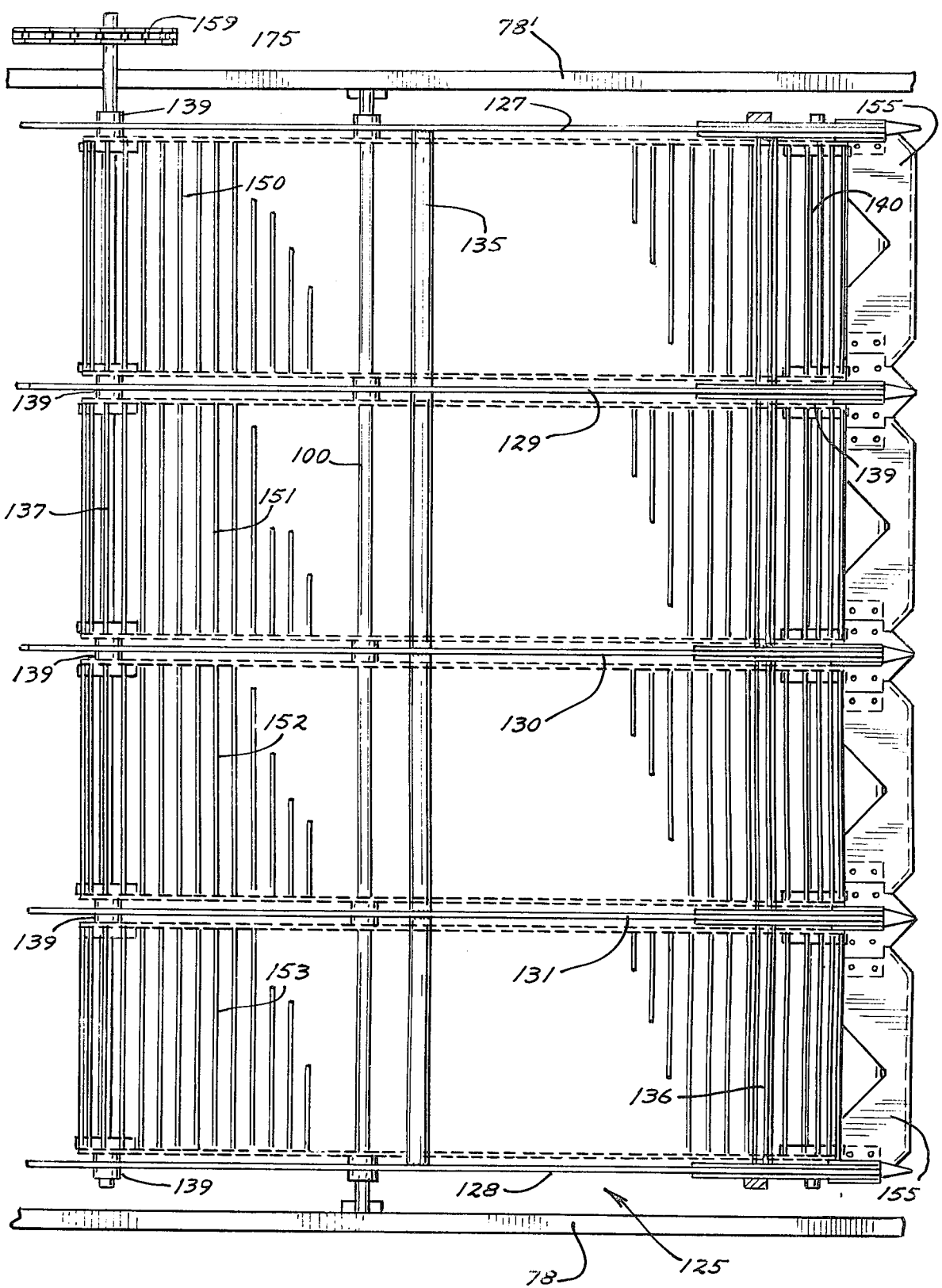

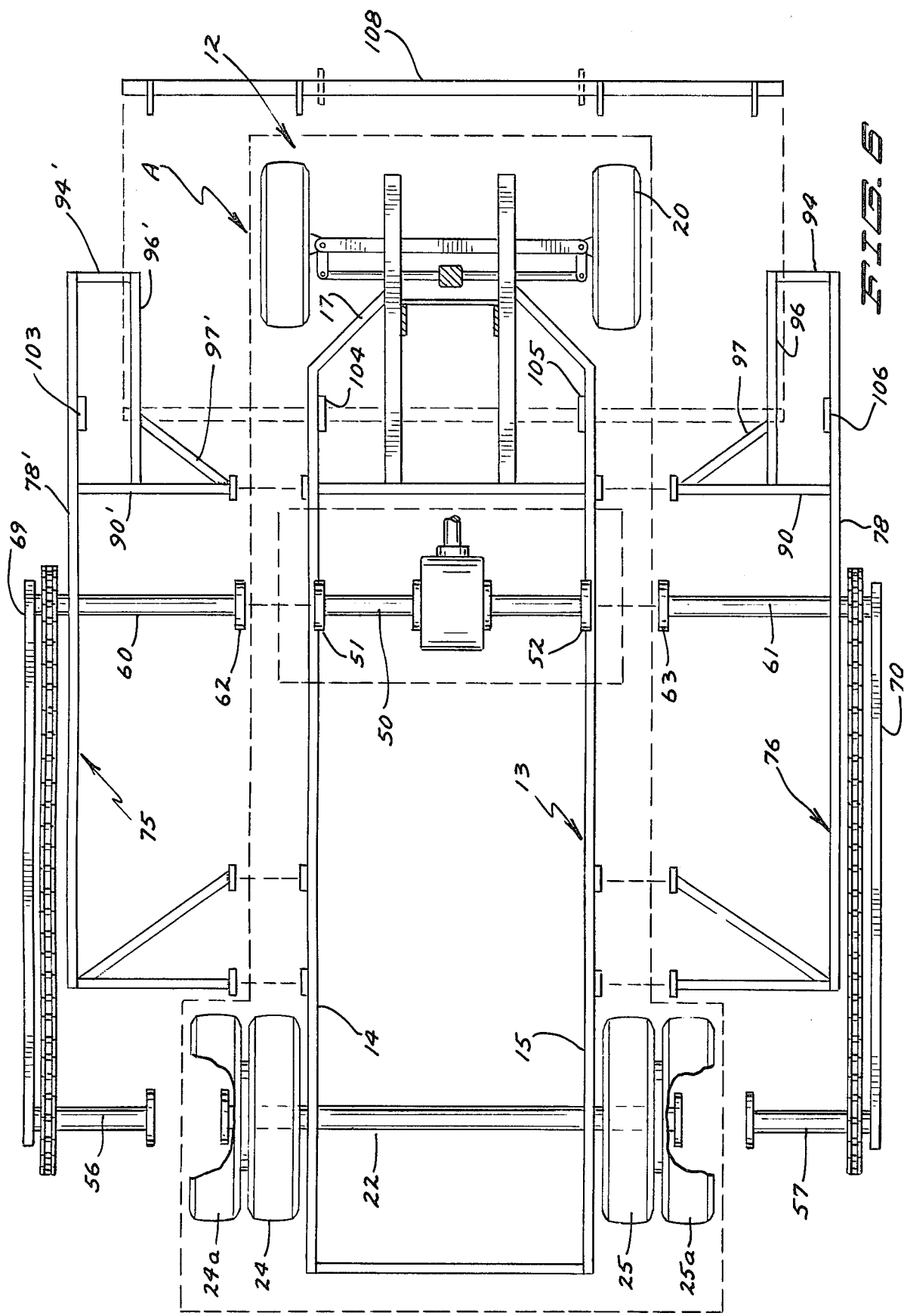

DEMOUNTABLE MULTI-ROW POTATO COMBINE

BACKGROUND AND SUMMARY OF THE INVENTION

It is a common practice to use one and two row potato combines or harvesters but is not been practical to build a three or four row potato combine.

In the conventional construction of a potato combine, a machine of a size to dig three or four rows of potatoes at one time would be too large and bulky for transport over roads or for shipment. However, with the increase in the number of rows of potatoes which may be harvested at one time with a single machine, there is a substantial reduction in the unit cost of harvesting potatoes and from a digging or harvesting cost point of view, this is highly desirable.

Hence, it is an object of this invention to provide the option of the use of a two row potato combine as such or providing for its modification for use as a three or four row potato combine, as may be desired.

It is another object of this invention to make use of the conveyor structure of a two row potato combine and to provide for the modification of its basic frame to accommodate a three or four row potato digger apron.

It is a further object of this invention in connection with the basic frame and conveyor superstructure of a two row potato combine to provide at least a three row potato digger apron, a demountable outboard frame to each side of said frame structure including a support member and yielding suspension means supporting said digger apron, a pair of angularly disposed conveyors in converging relation with one another being positioned rearwardly at each side of said digger apron to receive the crop passed upwardly by said digger apron and converging the same onto the single adjacent elevating conveyor of said basic frame and driving means in connection with said pair of conveyors and said digger apron.

It is a more general object of this invention in utilizing a two row potato combine frame structure to accommodate a three or four row potato digger apron to provide readily mounting and demountable structure for modification of said two row potato combine frame structure.

These and other objects and advantages of the invention will be set forth in the followiwng description made in connection with the accompanying drawings in which like reference characters refer to similar parts throughout the several views and in which:

FIGS. 1 and 2 are views in side elevation of each side of the apparatus herein and shown in oppositely facing directions with some portions being broken away;

FIG. 3 is a view in horizontal section taken on line 3—3 of FIG. 2 as indicated with portions thereof being broken away;

FIG. 4 is a view in horizontal section taken on line 4—4 of FIG. 1 as indicated, with portions thereof being broken away;

FIG. 5 is a broken top plan view showing a detail of structure; and

FIG. 6 is a diagrammatic exploded skeleton view in plan.

DESCRIPTION OF A PREFERRED EMBODIMENT

Figure 2:
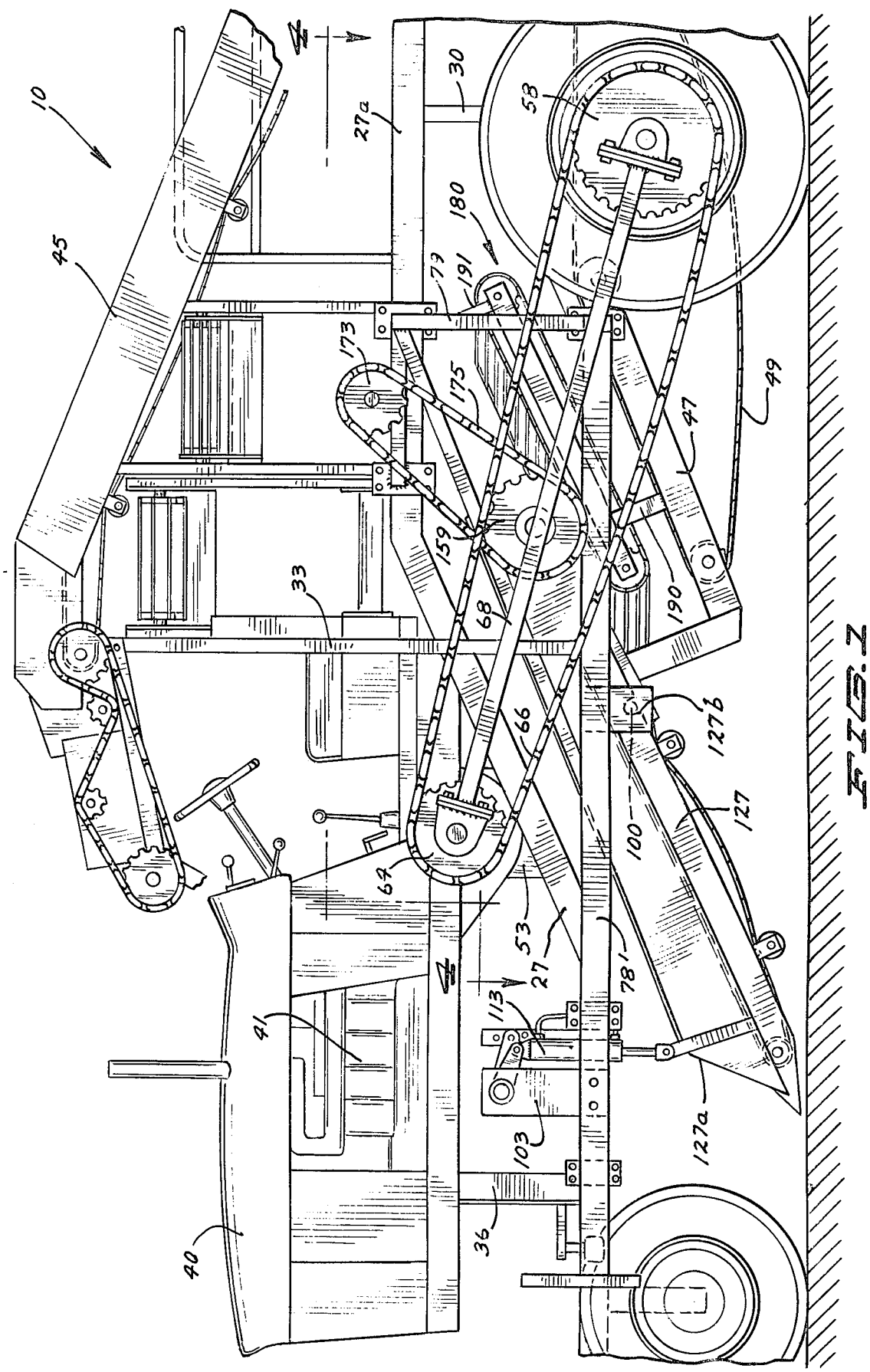
Figure 2:
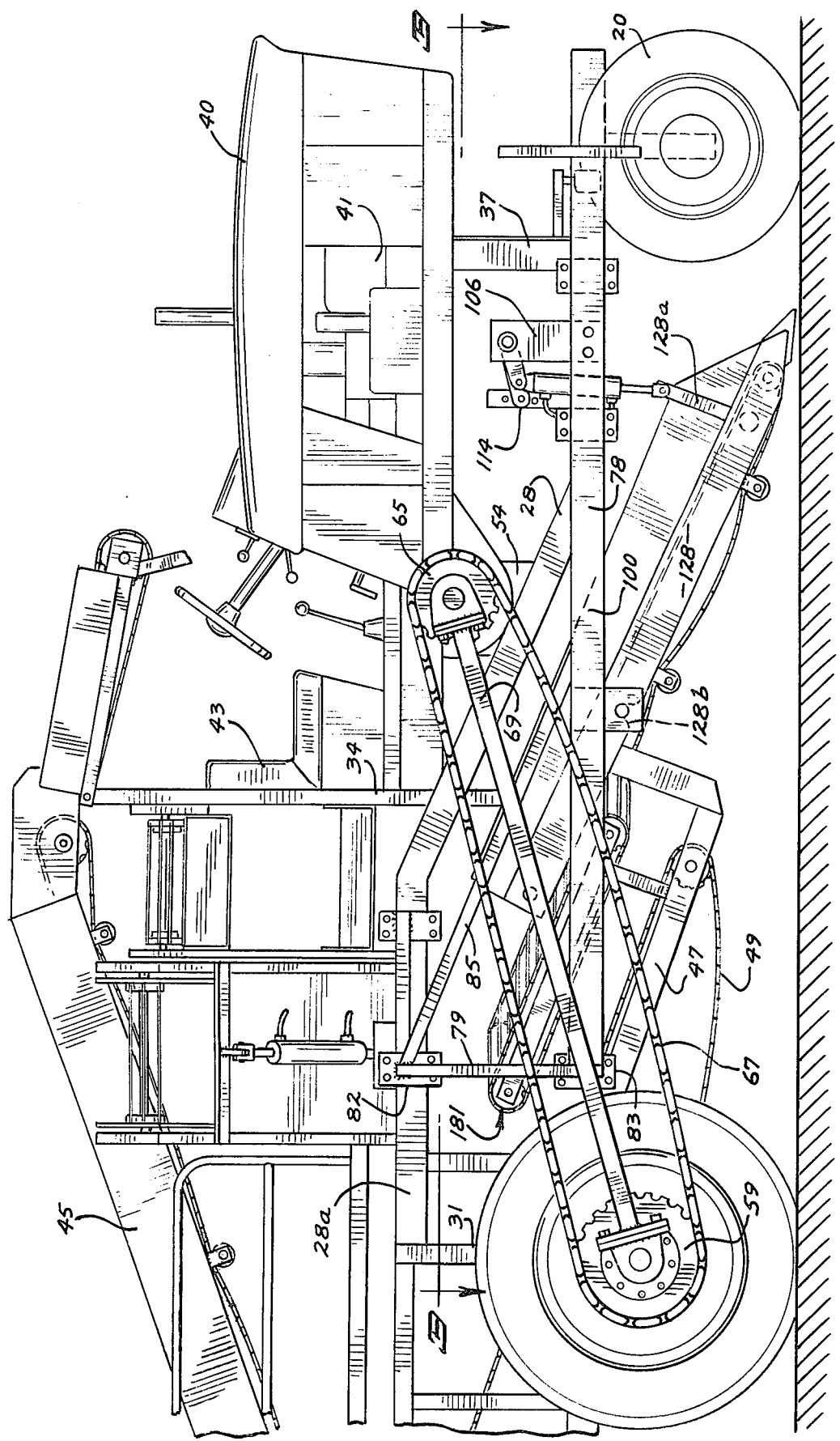

Referring to the FIGS. and especially to FIGS. 1, 2 and 6, a potato combine 10 is shown of which the basic structure 12 is that of a two row potato combine as will be described and which is of a conventional design and only as much thereof is here shown and will be described as is considered necessary to support the subject matter comprising the invention herein.

The subject matter comprising the invention herein as will be further described consists of outboard structure and inboard support members demountably attached to the frame of said two row combine to removably support and drive a four row potato digger apron, the essential novelty dealing with the structure for a demountable conversion of a two row combine into a four row combine.

Said two row combine structure 12 as indicated in skeleton form in the dotted area A by the numeral 12 in FIG. 6 will be briefly described and the same includes a basic frame structure 13 comprising a pair of lower side frame members 14 and 15 which have a converging front end frame portion 17 suitable supported by a front end wheel assembly 20. The rear end portion of said frame structure is suitably supported by an axle 22 extending between the rear wheels 24, 24a and 25, 25a.

Referring to FIGS. 1 and 2, inclined upwardly and rearwardly from the forward portions of said frame members 14 and 15 are frame members 27 and 28 having rearwardly extending horizontal portions 27a and 28a supported as by vertical frame members 30 and 31 extending upwardly from said frame members 14 and 15.

Extending upwardly of said frame members 27 and 28 are a transversely spaced pair of frame members 33 and 34 and forwardly thereof extending upwardly of the forward portions of said frame members 14 and 15 are a spaced pair of frame members 36 and 37. Supported by said members 33, 34 and 36, 37 is an engine housing 40 having an engine 41 forming a power source therein and a seating structure 43 therebehind.

Extending upwardly and rearwardly of aid frame portions 27a and 28a is a superstructure 45 comprising the upper conveyor system of said combine 12 which does not form a part of the subject matter comprising the invention herein and the same will not be further described.

Mounted between said frame members 14 and 15 in a conventional manner is an upwardly inclined conveyor frame 47 having a linked rod conveyor 49 mounted thereon and passing thereover and said conveyor 49 forms the elevating conveyor which first receives the crop passing upwardly of the digger apron as will be described.

Underlying the rear end portion of said engine housing is a main drive shaft 50 having junction bearing boxes 51 and 52 at each end thereof, the same being mounted onto and carried by stub frame support members 53 and 54 upstanding from said frame members 27 and 28.

Referring particularly to FIGS. 3 and 6, the frame members 14 and 15 indicate the width of said basic frame structure 12 as a two row potato combine. The outboard structure and inboard members removably attached to said basic frame structure, the four row potato digging apron, and a pair of angularly disposed converging conveyors as will all be described define the subject matter comprising the invention herein.

It will be noted that at this point, there is no potato digger apron carried by said frame work 12.

With general reference to the FIGS. except for FIG. 6, the rear wheels 24a and 25a will have stub shafts 56 and 57 extending outwardly thereof carrying sprockets 58 and 59 at their respective ends.

The drive shaft 50 has shaft extensions 60 and 61 extending outwardly of either end thereof respectively connected by junction bearing boxes 62 and 63 to said bearing boxes 51 and 52. Said shaft extensions respectively carry drive sprockets 64 and 65 in alignment with said sprockets 58 and 59.

Chains 66 and 67 respectively pass over sprockets 58, 64 and 59, 65. Tension rods 68 and 69 respectively extend between said pairs of sprockets secured to the respective shaft ends carrying said sprockets and being secured thereto in a known customary manner. Extending outwardly of either side of said basic frame structure and carried thereby are outboard or wing frame structures 75 and 76 which are identical in structure in opposite relation to one another.

Said outboard structure 76 comprises a longitudinal frame member 78 having a rearward upstanding frame member 79 which in turn has right angled inwardly extending vertically spaced frame members 80 and 81 to be bolted as with mating and connecting plate members 82 and 83 to the frame members 28a and 15 respectively. An angled brace member 85 extends from the upper end of said frame member 79 to an intermediate point of said frame member 78. A horizontal angled bracing member 87 is shown extending from the rear end of said frame member 78 to be bolted to said frame member 15 as indicated in FIG. 3 at 88.

A horizontal frame member 90 extends at a right angle from said frame member 78 to be bolted by mating plate members 92 to the forward portion of said frame member 15 as shown in FIG. 3.

Said frame member 78 has a forward inwardly right angled end frame portion 94 secured to the frame member 90 by a frame member 96 which is parallel to said frame member 78 and an angled brace 97 extends from said member 96 and an intermediate portion thereof to adjacent the inward end of said frame member 90.

The various portions of the outboard frame structure 75 bear like reference numerals with a prime added for like portions of said frame structure 76.

Removably secured between said frame members 78 and 78' spaced rearwardly of the shaft 50 is a digger apron pivot support shaft or tube 100 secured at its ends as by conventional pillow block support members 101 and 101'.

Upstanding from the forward portions of said frame members 14 and 15 and from aligned portions of said outboard frame members 78 and 78' are plate members 103–106 rigidly supporting a shaft 108 removably extending therethrough. Carried centrally of said shaft in spaced relation are a pair of downwardly angled suspension arms 110 and 111 of conventional structure to hold in suspension a potato digger apron and allow upward movement to accommodate an upward thrust of said apron as will be further described.

Carried adjacent each end of said shaft 108 are conventional hydraulic cylinders and arms 113 and 114 with said arms yieldingly suspending the front end portion of a potato digger apron as will be described.

Referring now to FIG. 5, a multi-row potato digger apron 125 is shown and in the present embodiment it is shown as a four row apron. It is the inventive concept herein that said digger apron be adapted for a greater number of rows that two and a four row apron is described for purpose of illustration and not for purpose of limitation.

Said digger apron also for purpose of illustration herein and not for purpose of limitation is indicated as being a rigid framework structure comprising side frame members 127 and 128 and intermediate parallel frame members 129, 130 and 131. Said parallel members are secured in spaced relation by spaced cross members 135 and 136 to form a unitary structure as by welding.

In a conventional manner, a drive shaft 137 extends through said frame members adjacent their rear end portions and said frame members are respectively provided with bearing housings 139 through which said drive shaft passes and by which it is supported. Said drive shaft carries a sprocket 159 at its end portion extending outwardly of said frame member 78'.

Extending through the forward end protions of said frame members is an idler shaft 140 carried and supported by bearings 139 as indicated in connection with said shaft 137.

In a conventional manner, which it is believed requires no specific description herein, said shafts 137 and 140 between the respective pairs of parallel frame members of said digger apron are provided with spaced pairs of sprockets over which pass conveyor belts to form the conveyors 150–153.

The forward end portion of said digger apron 125 is provided with shovels 155 which are of conventional structure and which will be mounted in a conventional manner.

Referring to FIGS. 3 and 5, said angled suspension arm members 110 and 111 will be removably secured as by bolting to the forward end portions of said frame members 129 and 131 as at 129a and 131a respectively, the same being indicated as being in the form of upstanding plate members. The hydraulic operated arms 113 and 114 will be removably secured in like manner to upstanding plate members or stud members 127a and 128a of frame members 127 and 128.

Said frame members 127–131 will each have an underlying open end notch or slot such as the notches 127b and 128b whereby said digger apron is pivotally rested on said shaft 100.

Referring to FIG. 4, extending rearwardly of said engine 41 is a driven shaft 160 running to a gear box 162 from which linkage 164 extends to a stub shaft 165 carrying a sprocket 166 and passing thereover and over sprocket 167 is a chain 169. Said sprocket 167 is carried by a shaft 171 suitably frame mounted in a cnventional manner and extending outwardly of frame member 78' to carry a sprocket 173. Passing over sprockets 173 and 159 is a sprocket chain 175 by means of which the drive shaft 137 of said digger apron 125 is driven.

With reference to FIGS. 3 and 4, it will be seen that with said two-row combine frame 13 having only one elevating conveyor 49 and that with the expansion of said frame by the addition of demountable outboard or wing structures 75 and 76 to accommodate a four row digger apron that means are required to converge the crop passing upwardly of the four conveyors of the digger apron onto the single elevating apron 49. For purpose of illustration herein, a pair of elevating conveyors 180 and 181 angularly upwardly inclined in converging directions toward one another are provided to converge the crop from the four conveyors of said digger apron onto the single elevating conveyor 49. Said conveyors 180 and 181 are of identical structure being oppositely disposed.

As indicated in FIGS. 1 and 4, the angularly disposed conveyor 180 comprises a basic conventional type frame 183 equpped with a drive shaft 184 at one end thereof and an idler shaft 185 at its other end, said shafts each having a pair of sprockets thereon not here shown and passing thereover is a conventional linked rod conveyor belt 186.

Said conveyor 180 underlies the rearward end of the adjacent portion of the digger apron 125 and has a shield 187 therealong at the side thereof remote from said digger apron. Said conveyor as indicated in FIG. 1 has its frame removably supported as by being bolted by a frame member 190 upstanding frm said conveyor frame 47 at one end thereof and having its elevated end removably secured as by bolting by the depending strap member 91 extending from the frame member 79'. Additional support members not here shown may be provided as needed and as will be well known in the art.

Referring to FIG. 4, a frame supported shaft 195 carries at its inner end a sprocket 196 over which passes a drive chain 197 passing also over a sprocket 198 carried by the shaft 165. Said shaft 195 carries at its outer end a sprocket 199 over which passes a chain 200, said chain also passing over a sprocket 202 carried on a shaft 204 which be linkage 205 is connected to and drives the shaft 184 and said conveyor 186.

Said conveyor 181 will have structure identical to that of the conveyor 180 disposed in opposed relation thereto and will be driven simultaneously in like manner and it is believed that no particular additional description is required with respect to said conveyor 181 or its related driving means.

OPERATION

The diagrammatic view of FIG. 6 shows the essential skeleton frame structure of a basic conventional two row potato combine 12 with the outboard frame structures 75 and 76 to be mounted thereon being shown in exploded position. FIG. 5 shows the multi-row digger apron 125 which is removably mounted onto the basic frame structure as expanded by the addition of said outboard frame structures, said apron being here illustrated as a four row digger apron.

Except for the removal of the two row digger apron with which the basic combine structure 12 would be otherwise eqipped, the remainder of said combine structure is utilized including its elevating and overhead coveyors of which the conveyors 45 and 47 are a representative part.

The outboard frame structures 75 and 76 will be removably mounted onto the frame structure 13 as first above described. The rear wheels 24a and 25a may be added or may be included as regular equipment for a two row combine, as may be desired. The shaft 22 will be extended to carry the rear drive sprockets 58 and 59. The main drive shaft 50 will be extended as first above described to carry the sprockets 64 and 65. Drive chains 66 and 67 respectively pass over said sprockets 58, 64 and 59, 65.

Hydraulic arm assemblies 113 and 114 will be mounted onto the forward portions of the outboard frame members 78 and 78' to yieldingly support in suspension the forward end portion of said digger apron 125 as shown providing vertical yielding movement about its supporting pivot shaft 100.

The pivot shaft 100 will be installed across the expanded frame 13 to pivotally support the digger apron somewhat rearwardly of its longitudinal center at its notched portions as indicated by the notches 127b and 128b shown in FIGS. 1 and 2.

The digger apron 125 is installed bodily onto frame 13 pivoted on said shaft 100 as above indicated and having its drive shaft 137 carried rearwardly thereof with said drive shaft having a sprocket 159 thereon extending outwardly of the frame member 78' to have the drive chain 175 pass thereover.

The front end portion of said digger apron as above described is held in yielding suspension by the hydraulic arms 113 and 114 and by the intermediate arms 110 and 111. Thus, said digger apron 125 has what might be called a floating mounting upon said pivot shaft 100.

All of the conveyors of said digger apron 125 are driven by the drive chain 175 with intermediate linkage running from the gear box 162 and the drive shaft 160 extending from the engine 41.

The angularly disposed converging conveyors 180 and 181 are readily mounted as first above described to converge the crop carried by the four conveyors of said digger apron 125 to pass the same onto the upper run of the single elevating conveyor or conveyor belt 49.

The entire four row digger assembly is readily demounted as will be understood from the description above given to convert the basic frame structure 12 to the reduced size of a two row combine or to reduce the frame size for transport of the apparatus and no further description or illustration as to demounting the apparatus is given.

The measurable savings in reduction of labor cost and in the relative increase in acreage dug in a given period of time over the performance of a two row combine makes the apparatus herein described one which provides significant economy of operation and makes very worthwhile the additional investment required in the apparatus.

It will be understood that the details and description omitted herein related to structure well known in the art.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is

1. A demountable multi-row potato combine, having in combination
    a potato combine frame structure including power means and elevating and related conveyor supersturcture,
    an outboard frame structure removably secured to each side of said frame structure,
    a pivot support member removably carried by said frame structure,
    yielding suspension means carried by said frame and outboard frame structures forwardly thereof,
    a digger apron member mounted onto said pivot support member, said digger apron member having at least three endless conveyors thereon,
    means connecting the forward portion of said digger apron member to said yielding means,
    a drive shaft,
    means operatively connecting said drive shaft and said digger apron member,
    a pair of angularly disposed endless conveyors in converging relation with each other underlying and extending partially beyond the rearward side portions of said digger apron member, means removably mounting said angularly disposed conveyors in operating position in connection with said frame and outboard structures, and means driving said drive shaft and said angularly disposed conveyors.

2. The structure set forth in claim 1, wherein said pivot support member comprises a shaft removably extending across said combine frame and outboard frame structure.

3. The structure set forth in claim 1, wherein said potato combine frame structure is of a not more than a two row potato combine.

4. The structure set forth in claim 1, wherein said yielding support means comprises a pair of arms having vertical movement, and a pair of hydraulic cylinders, whereby the front end portion of said digger apron is yieldingly suspended.

5. The structure set forth in claim 1, wherein said means connecting said drive shaft and said digger apron accommodating vertical movement of said digger apron.

6. A demountable multi-row potato combine, comprising a conventional two row combine frame structure including power means and an elevating and related conveyor superstructure, an outboard frame structure removably secured to each side of said frame structure, a digger apron member having mounted thereon at least three endless conveyors, a supporting member for said digger apron member removably carried by said frame structure, yielding supporting means carried forwardly of said frame structure, means connecting the forward end portion of said digger apron member with said yielding supporting means, a drive shaft, means operatively connecting said drive shaft and said conveyors carried by said digger apron member, a pair of conveyors in converging relation with each other underlying and extending partially beyond the rearward side portions of said digger apron member, means removably mounting said last mentioned conveyors in operating position, and means running from said power means driving said drive shaft and said last mentioned conveyors.

7. A demountable multi-row potato combine, having in combination a potato combine frame structure of not more than a two row potato combine including power means and an elevating and related conveyor superstructure mounted thereon, an outboard frame structure removably secured to each side of said frame structure, a removable pivot shaft extending across said frame and said outboard frame structure, yielding supporting means carried by said frame and outboard frame structure forwardly thereof, a potato digger apron member including at least three endless conveyors thereon pivotally mounted on said pivot shaft and means connecting the same to said yielding means, a drive shaft in operative association with said digger apron member, an angularly disposed conveyor partially underlying and extending beyond each rear end portion of said digger apron member, means removably mounting said angularly disposed conveyors onto said frame and outboard frame structure, said last mentioned conveyors being arranged and constructed to converge crop passing up the conveyors of said digger apron member onto said elevating conveyor, and said power means driving said drive shaft and said last mentioned conveyors.

8. A demountable multi-row potato combine, having in combination a potato digger apron member including at least three endless conveyors thereon, a potato combine frame structure including power means and an elevating and related conveyor superstructure, an outboard frame structure removably secured to each side of said combine frame structure, a pivot support member for said digger apron member removably carried by said frame structure, yielding suspension means for the forward portion of said digger apron member carried by said frame and outboard frame structures, a drive shaft in operative association with said digger apron member, a pair of angularly disposed endless conveyors in converging relation with each other underlying and extending partially beyond the rearward side portions of said digger apron member, means removably mounting said last mentioned conveyors in operating position in connection with said frame and outboard frame structures, and means driving said drive shaft and said last mentioned conveyors.

* * * * *